July 1, 1969 D. C. GALL 3,453,528
PHOTOELECTRIC CONTROLLED CURRENT REGULATOR
Filed Sept. 28, 1966 Sheet 1 of 3

United States Patent Office 3,453,528
Patented July 1, 1969

3,453,528
PHOTOELECTRIC CONTROLLED CURRENT REGULATOR
Douglas Crisp Gall, Chantersell, Nutley, Sussex, England
Continuation-in-part of application Ser. No. 346,471, Feb. 21, 1964. This application Sept. 28, 1966, Ser. No. 582,701
Int. Cl. G05f 1/52
U.S. Cl. 323—4
21 Claims This invention relates to apparatus for automatically controlling direct electric currents at precise values and is a continuation-in-part of my U.S. application Ser. No. 346,471 filed on Feb. 21, 1964, now abandoned.

One application of the invention is to generate direct voltages of precise values.

The object of the invention is to provide an improved apparatus which will have a very high precision.

According to the invention, there is provided apparatus for automatically controlling the magnitude of a direct current in a load at a predetermined value, the apparatus comprising a precision-resistance circuit connected in series with said load to carry said direct current to thereby generate across said precision-resistance circuit a voltage drop proportional to the magnitude of said direct current, a power transistor connected in series with said load, a first photo-transistor electrically connected to said power transistor to vary the resistance of said power transistor as a function of the degree of illumination of said photo-transistor, a first direct-current source providing a highly stable reference voltage and so connected across said precision-resistance circuit that said reference voltage is in opposition to said voltage drop, the magnitude of the resistance of said precision-resistance circuit being so chosen that said voltage drop is equal in magnitude to said reference voltage when the magnitude of said direct current in said load is equal to said predetermined value, a second direct-current source, third and fourth photo-transistors arranged in close physical association, a direct-current bridge circuit supplied from said second source and having two of its arms respectively formed by said second and third photo-transistors, a first reflecting galvanometer electrically connected to said precision-resistance circuit to respond to the voltage difference between said reference voltage and said voltage drop to vary the degree of illumination of said second and third photo-transistors whereby the output of said bridge circuit represents said voltage difference in magnitude and sign, and a second reflecting galvanometer electrically connected to said bridge circuit to respond to said output to vary said degree of illumination of said first photo-transistor.

Some embodiments of the invention will now be described by way of example, reference being made to the accompanying drawings in which.

Figure 1:
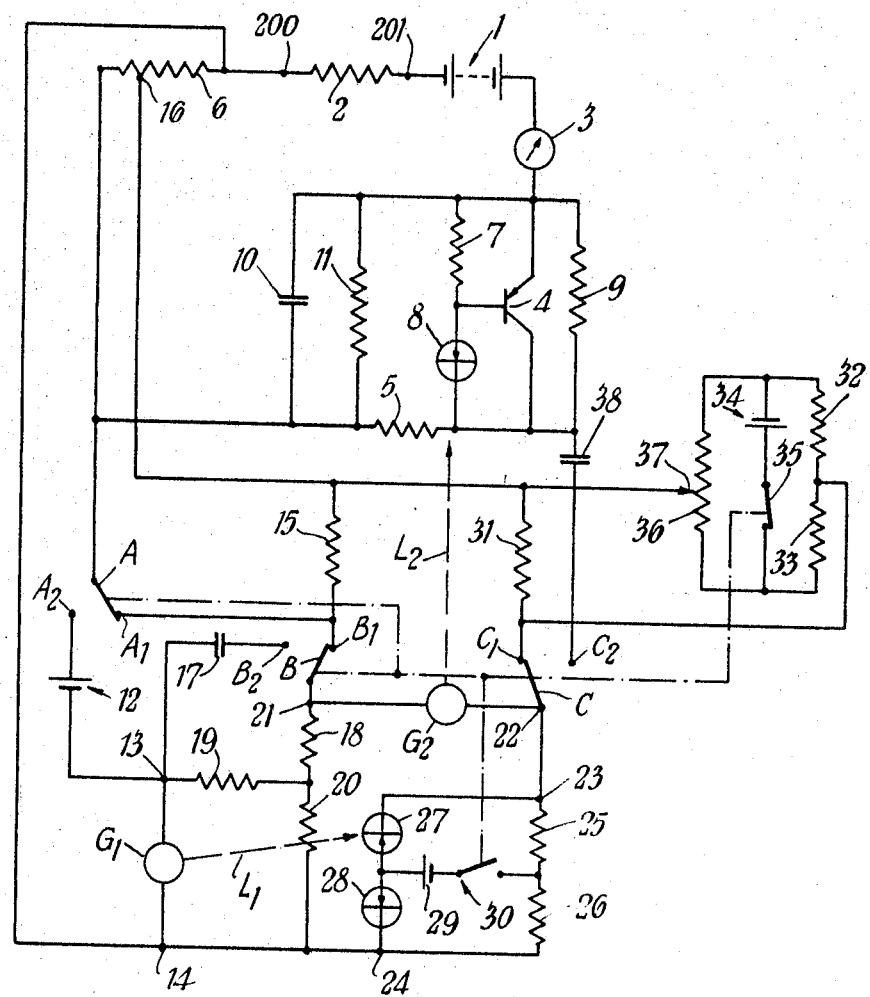
FIG. 1 is a circuit diagram illustrating one embodiment of the invention.

Referring first to the arrangement illustrated in FIG. 1, a load circuit in which the current is to be controlled to a high degree of precision comprises a source of direct current 1, a load connected across terminals 200 and 201 and represented by a resistor 2, an indicating ammeter 3, a power transistor 4, a feedback resistor 5 and a precision resistor 6, all connected in series with each other. Connected in series across the transistor 4 are a resistor 7 and a photo-transistor 8, the junction between these being connected electrically to the base of the power transistor 4. Also connected across the transistor 4 is a resistor 9 while a capacitor 10 and resistor 11 are connected in parallel between the junction between resistors 5 and 6 and the junction between the transistor 4 and the ammeter 3.

Three single-pole double-throw switches which are ganged to operate together are shown at A, B, and C, the positions of the moving contacts shown corresponding to the conditions for setting up the apparatus, wherein the moving contacts bear respectively on fixed contacts $A_1$, $B_1$, and $C_1$. When he apparatus is in use, the moving contacts of these switches bear respectively on the fixed contacts $A_2$, $B_2$ and $C_2$.

An electrical connection is made from the moving contact of the switch A to the junction between the resistors 5 and 6, and the contact $A_2$ is connected to the positive terminal of a standard cell 12 which has its negative terminal electrically connected to one terminal 13 of a reflecting galvanometer $G_1$. The other terminal 14 of the latter is electrically connected to the junction between the resistor 6 and the load 2.

The contacts $A_1$ and $B_1$ are electrically connected to one end of a resistor 15 having its other end electrically connected to a suitably selected tapping point 16 on the precision resistor 6. The fixed contact $B_2$ of the switch B is connected through a capacitor 17 to the terminal 13, and the moving contact of this switch is connected both to a proportional feedback network comprising resistors 18, 19 and 20 and to the one terminal 21 of a second reflecting galvanometer $G_2$.

The moving contact of the switch C is electrically connected to the other terminal 22 of the galvanometer $G_2$ and also to the one end 23 of a diagonal of a bridge circuit having the other end 24 of this diagonal connected to the terminal 14. The bridge circuit has two arms respectively composed of resistors 25 and 26 and two further arms respectively composed of photo-transistors 27 and 28, the other diagonal of the bridge circuit having connected across it, in series, a small source 29 of direct current and a switch 30 which is ganged with the switches A, B and C so that it will be opened as the moving contacts of the latter move on to the contacts $A_1$, $B_1$ and $C_1$, respectively.

Of the fixed contacts of the switch C, that marked $C_1$ is electrically connected both to one end of a resistor 31 and to the junction between two resistors 32 and 33 of a setting-up bridge network having a small source 34 of direct current connected in series with a switch 35 across these resistors. The other arms of the bridge network are composed of the two parts of a resistor 36 disposed at either side of a sliding contact 37 which may be adjusted along the resistor to vary the relative lengths of those two parts. The contact 37 is electrically connected to the other end of the resistor 31 and to the corresponding end of the resistor 15, and the switch 35 is ganged with the switches A, B and C so that it will be opened as the moving contacts of the latter move on to the contacts $A_2$, $B_2$ and $C_2$, respectively. The other fixed contact $C_2$ of the switch C is electrically connected through a capacitor 38 to the junction between the transistor 4 and the feedback resistor 5.

The photo-transistors 27 and 28 are arranged in close physical association so that a beam of light reflected from the mirror of the galvanometer $G_1$ (indicated by the broken line $L_1$) will impinge on both transistors when the galvanometer is in its null position and will be moved to illuminate the one or other transistor to a greater extent than the other as the galvanometer is deflected in the one or other direction. Similarly, the photo-transistor 8 is arranged so that it will be illuminated by a beam of light (indicated by broken line $L_2$) reflected from the mirror of the galvanometer $G_2$, a mask or cut-off device (not shown) being interposed so that the degree of illumination will vary with the deflection of this galvanometer.

When the apparatus is in use for controlling the current in the load circuit, the moving contacts of the switches A, B and C are bearing on the fixed contacts $A_2$, $B_2$ and $C_2$, the switch 30 is closed and the switch 35 is open. It will be seen that the negative terminal of the source 1 of direct current is connected (through the load 2) to that end of the precision resistor 6 to which the negative terminal of the standard cell 12 is connected (through the galvanometer $G_1$). The resistor 6 is selected to have an ohmic value such that the passage therethrough of the required load-circuit current will produce a voltage drop across the resistor 6 equal to the reference voltage provided by the standard cell 12. Should the current flowing in the load circuit vary from the required value, the galvanometer $G_1$ detects and responds to the magnitude and sign of the voltage difference produced across the resistor 6. The consequent deflection of the light beam $L_1$ changes the illumination of the photo-transistors 27 and 28 in such manner that the bridge circuit containing them is unbalanced in the appropriate sense to cause the galvanometer $G_2$ in turn to deflect the light beam $L_2$ to vary the illumination of the photo-transistor 8. This causes a change in the resistance of the transistor 8 which alters the potential applied to the base of the power transistor 4 to cause the effective resistance of the latter to change, in turn, and allow an increase or decrease, as the case may be, in the current flowing in the load circuit. It will be understood that the arrangement is such that an incipient increase in the load current above the required value will cause an increase in the effective resistance of the power transistor 4 which will change the overall resistance of the load circuit to a value such that the load current will return to the required value. The power transistor in fact behaves as an infinitely variable resistor.

The galvanometer $G_1$ is of extremely high sensitivity, it being sensitive to one-hundredth of a microvolt, and the voltage difference which necessarily persists between the voltage drop produced across the resistor 6 by the load current and the reference voltage produced by the standard cell is controlled to this order of equality.

By the use of a power transistor 4 (if necessary several in parallel), very large load currents can be controlled to an accuracy of a few parts in a million. A large-capacity battery to supply the current is required but this can be on floating charge, if necessary, without disturbing the automatic control.

The galvanometer $G_1$ is of great sensitivity and zero stability and must have high damping and freedom from vibration, a liquid-filled shock-proof galvamoneter being satisfactory. The use of such a galvanometer also minimises thermal drift which could become significant at this low level of voltage measurement. The circuit of the controlling apparatus must, of course, be screened from temperature variations and the standard cell must be temperature controlled to give the required stability of the reference voltage to parts in a million.

It will be appreciated that when the load circuit has to be switched on and off, the equilibrium between the voltage drop across the resistor 6 and the reference voltage may be momentarily disturbed and this would ordinarily cause a large out-of-balance voltage to be applied to the sensitive galvanometer $G_1$. However, the switching arrangements are provided (switches A, B, C, 30 and 35) to allow the equilibrium to be approximately established before the full sensitivity of the apparatus is used. This switching also prevents out-of-balance currents being drawn from the reference voltage source which might otherwise cause a temporary alteration in the reference E.M.F. When the switches are operated to their setting-up positions, the setting bridge circuit provides a small current which is adjusted by means of the contact 37 to maintain the two galvanometers at their control positions so that, when switching the controller on and off, the minimum disturbance will occur in the controller circuit.

The damping of the controller circuit is arranged to prevent the oscillation which would otherwise occur by reason of the very high power gain achieved. An essential feature is the introduction of a rate-of-change feedback and in the circuit illustrated this is effected by means of the capacitor 38. Alternatively, this could be effected by a filter of the parallel T type tuned to the response frequency of the galvanometer $G_2$.

It will be understood that the combination of a sensitive input galvanometer with a bridge circuit containing photo-transistors illuminated by the light-beam reflected from the galvanometer and in turn controlling a further galvanometer which varies the illumination of a further phototransistor is capable, with some modification, of serving as a high-sensitivity D.C. amplifier. For example, the input galvanometer may be supplied with a minute D.C. signal and control the illumination of two photo-transistors arranged in a bridge circuit the output from which is fed to a further galvanometer which similarly controls the illumination of a further pair of photo-transistors arranged in another bridge circuit. The output from the second bridge circuit may be fed to an indicating meter.

Figure 2:
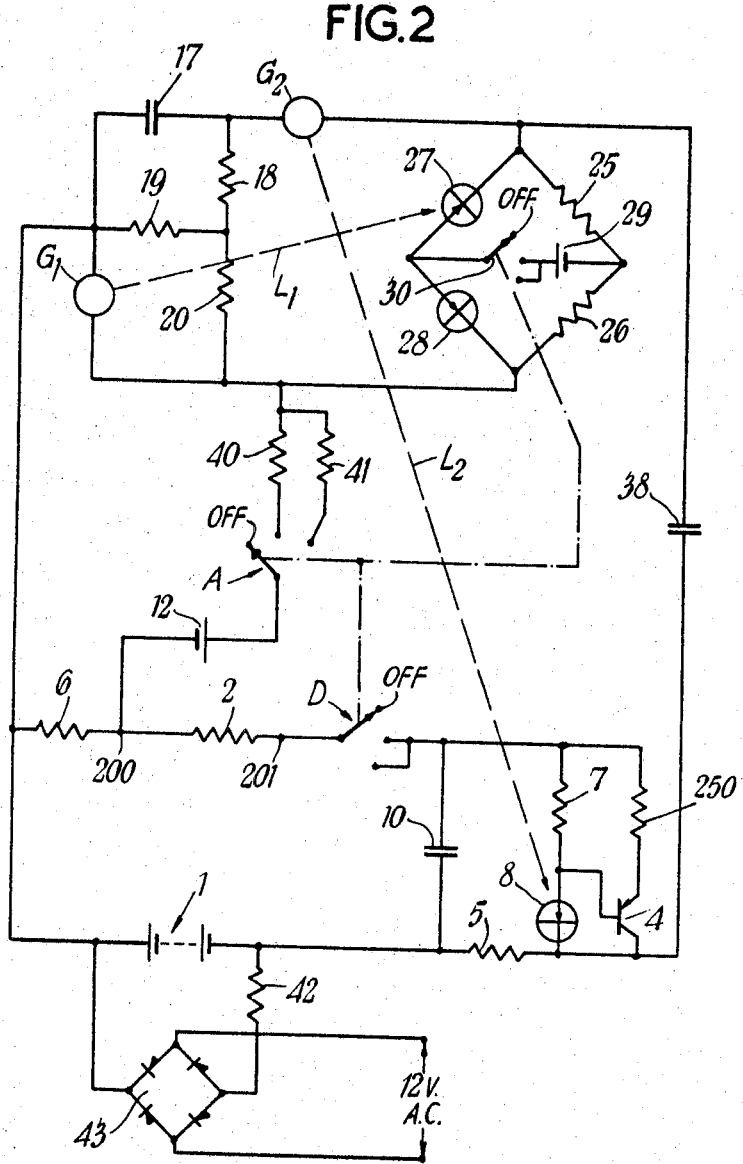
FIG. 2 is a circuit diagram illustrating a modification of the arrangement of FIG. 1.

The circuit arrangement illustrated in FIG. 2 is very similar to that illustrated in FIG. 1 and like references are used to denote like parts. In this arrangement, the setting bridge circuit 32, 33, 34, 35, 36 and 37 is omitted together with associated resistors 15 and 31 and the tapping point 16 on the precision resistor 6. The switches B and C are also omitted and a switch D is provided in the load circuit. The switches A, D and 30 are, in this example, ganged three-way switches one position of which is the "OFF" position. Switches D and 30 have the second and third positions strapped together but switch A is arranged so that in the second position it connects the standard cell 12 to the galvanometer $G_1$ through a high-value resistor 40, e.g. of 30K ohms and in the third position it replaces the resistor 40 by a resistor 41 of low value, e.g. of 100 ohms. This prevents large out-of-balance voltages being applied to the sensitive galvanometer when the load circuit has to be switched ON and OFF. Thus, when the switches are switched from the OFF position to the second position, the high-value resistor 40 is in circuit and equilibrium is approximately established before the full sensitivity of the arrangement is made effective by switching to the third position.

The circuit of FIGURE 2 further differs from that of FIGURE 1 in that in the load circuit, a resistor 250 is connected in series with the power transistor 4.

As has been mentioned above, the battery 1 may be on floating charge and this is shown in FIG. 2 where the battery 1 is connected through a resistor 42 across a full-wave bridge rectifier circuit 43 supplied from a 12-volt A.C. source.

The operation of the circuit arrangements of FIG. 2 is similar to that described with reference to FIG. 1.

Referring to FIGURES 1 and 2, it will be appreciated that the circuits of those figures operate to maintain constant, at a predetermined value, the magnitude of the direct current flowing through the load resistor 2.

Thereby, the direct voltage developed across the resistor 2, between the terminals 200 and 201, is evidently maintained constant at a corresponding predetermined value, so that the apparatus may be used to generate a constant direct voltage.

The predetermined value of the current flowing through the load resistor 2, and the predetermined value of the corresponding voltage developed across the resistor 2, are determined by the magnitude of the resistance of the precision resistor 6. It follows that, if the magnitude of the resistance of the resistor 6 is changed, then the circuits of FIGURES 1 and 2 will operate to maintain the current through the resistor 2, and the corresponding voltage developed across the resistor 2, constant at predetermined values which are different from the previous values and which are determined by the new value of the resistance of the resistor 6.

Thus, if the resistor 6 of FIGURES 1 and 2 is replaced by switching means arranged to selectively connect a number of different precision resistances in turn between the terminals (FIGURES 1 and 2) to which the precision resistor 6 was formerly connected, there results an apparatus which will automatically control the current flowing through the load resistor 2 to any one of a plurality of predetermined values, and which will also thereby automatically control the corresponding voltage developed across the load resistor 2 to any one of a plurality of predetermined values.

Figure 3:
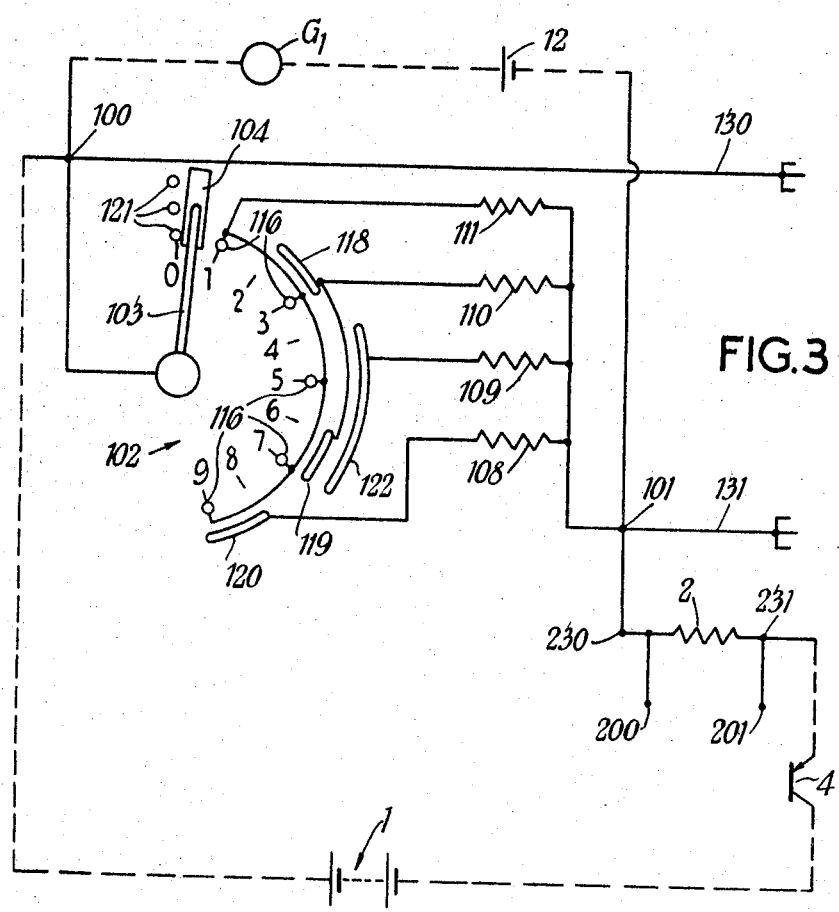
FIG. 3 is a fragmentary circuit diagram illustrating a modification of the circuits of FIGURES 1 and 2.

One such arrangement is shown in FIGURE 3, which indicates the necessary modifications to the circuits of FIGURES 1 and 2. Referring to FIGURE 3, the load circuit discussed with reference to FIGURES 1 and 2 is indicated incompletely as comprising the load resistor 2, the power transistor 4 and the source 1 connected together in series between terminals 100 and 101 which terminals correspond to the terminals of the precision resistor 6 of FIGURES 1 and 2. In FIGURE 3, the galvanometer $G_1$ and the standard cell 12 are indicated as connected together in series in an auxiliary circuit extending between the terminals 100 and 101. It is to be understood that the actual load circuit of FIGURE 3, and the actual auxiliary circuit of FIGURE 3, are in fact of either of the kinds shown in detail in FIGURES 1 and 2, certain components having been omitted in FIGURE 3 for simplicity of description.

In the circuit of FIGURE 3, the precision resistor 6 of FIGURES 1 and 2 would extend between the terminals 100 and 101. It is, however, replaced in FIGURE 3 by a 10 position rotary electrical switch 102, the positions of which are indicated as 0, 1, 2, 3, 4, 5, 6, 7, 8, 9, associated with four precision resistors 108, 109, 110, and 111. The switch 102 has a movable contact arm 103 (shown offset from the 0-position in FIGURE 3, for clarity) which is connected to the terminal 100 and which has, at its outer end, flexible contacts 104 which engage with contact studs arranged in three different-radius arcs about the centre of rotation of the arm 103.

One terminal of each of the resistors 108, 109, 110 and 111 is connected to the terminal 101. The other terminal of the resistor 111 is connected to five contact studs 116 disposed upon the innermost of the three said arcs at the positions 1, 3, 5, 7 and 9 of switch 102. The other terminal of the resistor 110 is connected to two contact studs 118 and 119 which are disposed around the centre one of the three said arcs so as to respectively extend between positions 2 and 3, and positions 6 and 7, of the switch 102. The other terminal of the resistor 109 is connected to a contact stud 122 which is disposed around the outermost of the said three arcs so as to extend between positions 4 and 7 of the switch 102. The other terminal of the resistor 108 is connected to a contact stud 120 which is disposed around the centre one of the three said arcs so as to extend between positions 8 and 9 of the switch 102.

When the switch 102 is in its 0-position, its contacts 104 rest upon dummy contact studs 121 to provide an open circuit between terminals 100 and 101. When the switch 102 is in any other of its positions, its contacts 104 connect the relevant contact studs of the said three arcs to the terminal 100 to thereby connect at least one of the resistors 108; 111, or two or three of those resistors in parallel, between the terminals 100 and 101, according to the following table:

| Position of switch 102: | Resistors connected between terminals 100 and 101 |
|---|---|
| 0 | None (open circuit). |
| 1 | 111. |
| 2 | 110. |
| 3 | 111 and 110 in parallel. |
| 4 | 109. |
| 5 | 111 and 109 in parallel. |
| 6 | 110 and 109 in parallel. |
| 7 | 111, 110 and 109, all in parallel. |
| 8 | 108. |
| 9 | 111 and 108 in parallel. |

It may be shown that, with the switch 102 arranged as in this table, then, if the magnitudes of the resistances 111, 110, 109 and 108 are respectively $8x$, $4x$, $2x$ and $x$ (ohms), where $x$ is a constant, then for positions 0, 1, 2, 4, 5, 6, 7, 8, 9 of the switch 102, the direct current flowing through the load resistor 2 will be controlled at the respective predetermined magnitudes of 0, 1, 2, 3, 4, 5, 6, 7, 8, 9 basic units of current, where the magnitude of the basic unit of current is determined by the magnitude of $x$.

Thus, for example, if the E.M.F. of the standard cell 12 is 10 volts, and if the value of the load resistor 2 is 1 ohm, and if $x = 12.5 \times 10^6$ ohms, then, at positions 0, 1, 2, 3, 4, 5, 6, 7, 8, 9 of the switch 102 currents respectively of 0, 1, 2, 3, 4, 5, 6, 7, 8, 9 tenths of a microamp will flow through the load resistor 2 and will be accurately controlled at those values.

The switch 102 and the resistors 108–111 thus form a decade switch connected between the terminals 100 and 101. One or more further and similar decade switches (not shown) may be connected in parallel with the decade switch shown, between the terminals 100 and 101, by means of the lines 130 and 131, the further decade switches being associated with different basic units of current. Thus, for example, one further decade switch may be similar to that of FIGURE 3 but arranged, at its positions 0, 1, 2, 3, 4, 5, 6, 7, 8, 9, to cause currents of 0, 1, 2, 3, 4, 5, 6, 7, 8, 9, microamps to flow through the load resistor 2 (this requires $x = 1.25 \times 10^6$ ohms). In such case, if the decade switch of FIGURE 2 and the further decade switch are both set at their positions 2, then a current of 2.2 microamps will flow through the load resistor 2.

It will further be clear that, since the position of the decade switch or switches selects the value of the predetermined current flowing through the load resistor 2, the voltage developed across the load resistor 2 is thereby also selected, so that the apparatus of FIGURE 3 acts to generate a predetermined voltage between the terminals 200 and 201 of the resistor 2, the magnitude of which predetermined voltage can be selected by appropriate choice of the positions of the decade switches.

In the arrangement of FIGURE 3, the magnitudes of the resistances of the resistors 108, 109, 110 and 111 are in the ratio 1:2:4:8. However, with appropriate modifications to the connections of the switch 102, the resistances of these resistors may instead be in the ratio 1:2:2:5, or in the ratio 1:2:3:4.

It will be understood that although, in the arrangement of FIGURE 3, only four precision resistors 108–111 are connected, in different arrangements, by the switch 102, between the terminals 100 and 101, any other suitable arrangement of precision resistors may be employed instead.

Furthermore, the switch 102 may be replaced by relay contacts (not shown) arranged to perform the same functions as the switch 102.

Figure 4:
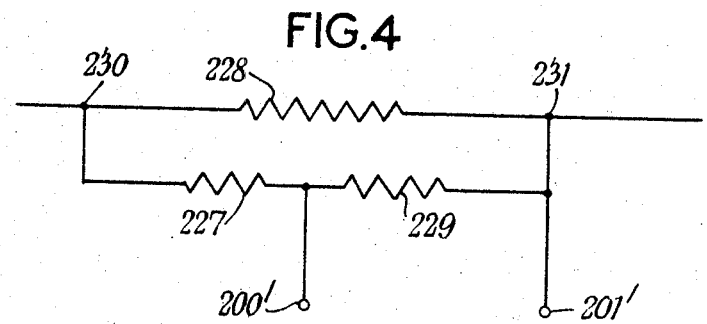
FIG. 4 is a fragmentary diagram illustrating a modification of the circuit of FIG. 3.

In FIGURES 1, 2 and 3, the load resistor 2 is temperature-compensated so that its resistance does not vary appreciably with the magnitude of the current flowing through the load resistor. In one such arrangement, the resistor 2 is formed in two parts of which one is made of material having a positive temperature coefficient of resistance while the other is made of material, for example an alloy, having a negative temperature coefficient of resistance. In another arrangement shown in FIGURE 4, the load resistor 2 of FIGURE 3 is replaced by the combination of a resistor 229 made of a selected alloy having a positive temperature coefficient of resistance which is lower than that of copper and connected in series with a copper resistance 227, the series-connected resistors 229 and 227 being connected in parallel with a resistor 228 of the said selected alloy; by suitable choice of the resistors 227, 228 and 229, the combination of the resistors, extending between the terminals 230 and 231, may be caused to have a net resistance which is substantially independent of the magnitude of the current flowing through the combination, while, in addition, the voltage drop developed across the resistor 229 will be proportional to the magnitude of the current flowing through the combination.

I claim:

1. Apparatus for automatically controlling the magnitude of a direct current in a load at a predetermined value, the apparatus comprising a precision-resistance circuit connected in series with said load to carry said direct current to thereby generate across said precision-resistance circuit a voltage drop proportional to the magnitude of said direct current, a power transistor connected in series with said load, a first phototransistor electrically connected to said power transistor to vary the resistance of said power transistor as a function of the degree of illumination of said photo-transistor, a first direct-current source providing a highly stable reference voltage and so connected across said precision-resistance circuit that said reference voltage is in opposition to said voltage drop, the magnitude of the resistance of said precision-resistance circuit being so chosen that said voltage drop is equal in magnitude to said reference voltage when the magnitude of said direct current in said load is equal to said predetermined value, a second direct-current source, second and third photo-transistors arranged in close physical association, a direct current bridge circuit supplied from said second source and having two of its arms respectively formed by said second and third photo-transistors, a first reflecting galvanometer electrically connected to said precision-resistance circuit to respond to the voltage difference between said reference voltage and said voltage drop to vary the degree of illumination of said second and third photo-transistors whereby the out-put of said bridge circuit represents said voltage difference in magnitude and sign, and a second reflecting galvanometer electrically connected to said bridge circuit to respond to said output to vary said degree of illumination of said first photo-transistor.

2. Apparatus according to claim 1, wherein said first galvanometer is connected in series with said first source across said precision-resistance circuit.

3. Apparatus according to claim 1, wherein said first photo-transistor is connected between the base and the collector of said power transistor.

4. Apparatus according to claim 1, which includes a proportional-feedback network electrically connected to said precision-resistance circuit, and wherein said second galvanometer is connected in series with one part of said proportional-feedback network across one diagonal of said bridge circuit, said first galvanometer being connected across another part of said feedback network.

5. Apparatus according to claim 1, including derivative feedback means electrically connected between said bridge circuit and said power transistor.

6. Apparatus according to claim 5, wherein said derivative feedback means includes a capacitor.

7. Apparatus according to claim 1, including a setting circuit for supplying a small direct current to said precision resistance, and switch means operable selectively to connect said setting circuit to said precision-resistance circuit whilst disconnecting said first source from said precision-resistance circuit and to connect said first source to said precision-resistance circuit whilst disconnecting said setting circuit from said precision-resistance circuit.

8. Apparatus according to claim 7, which includes first and second ressitors, and a third resistor divided by a variable tapping into two parts, said setting circuit comprising a bridge network whereof two arms are formed respectively by said first and second resistors and the remaining two arms are formed respectively by said two parts of said third resistor, said variable tapping being electrically connected to a tapping of said precision-resistance circuit.

9. Apparatus according to claim 1, wherein said precision-resistance circuit is formed by a single precision resistor.

10. Apparatus for automatically controlling the magnitude of a direct current in a load at any one of a plurality of predetermined values, the apparatus including apparatus according to claim 1, wherein said precision-resistance circuit comprises a plurality of precision resistances equal in number to the number of said predetermined values and switching means electrically connected to said precision resistances and operable to selectively connect any one of said precision resistances into said precision-resistance circuit to thereby select one of said predetermined values, the magnitude of the resistance of each precision resistance being so chosen that said voltage drop across said precision-resistance circuit is equal in magnitude to said reference voltage when the magnitude of said direct current in said load is equal to that one of said plurality of predetermined values which is associated with the precision resistance in question.

11. Apparatus according to claim 10, wherein said precision-resistance circuit includes a plurality of precision resistors, and wherein said switching means operates to selectively connect at least one at a time of said precision resistors into said precision-resistance circuit to thereby form said plurality of precision resistances.

12. Apparatus according to claim 11, wherein the magnitudes of the resistances of said precision resistors are so selected, and wherein said switching means is so arranged, that said predetermined values of said magnitude of said direct current in said load are in arithmetic progression.

13. Apparatus according to claim 12, wherein said switching means has at least nine positions corresponding respectively to nine different said predetermined values of said magnitude of said direct current in said load.

14. Apparatus according to claim 13, wherein there are four of said precision resistors.

15. Apparatus according to claim 14, wherein the magnitudes of the resistances of said precision resistors are in a selected one of the ratios 1:2:4:8, 1:2:2:5, and 1:2:3:4.

16. Apparatus according to claim 1, wherein said load comprises a load resistance.

17. Apparatus according to claim 16, wherein said load resistance comprises a single load resistor.

18. Apparatus according to claim 17, wherein said single load resistor is formed in two parts of which one is made of material having a positive temperature coefficient of resistance while the other is made of material, for example an alloy, having a negative temperature coefficient of resistance, whereby the magnitude of the resistance of said single load resistor is substantially independent of the current flowing through said single load resistor.

19. Apparatus according to claim 16, wherein said load resistance comprises a first load resistor connected in parallel with a circuit comprising second and third load resistors connected together in series, the materials of said first, second and third load resistors being so selected with regard to the temperature coefficients of resistance of said materials that the magnitude of the resistance of said load resistance is substantially independent of the load current flowing therethrough while the voltage drop across said third load resistor is proportional to the magnitude of said load current.

20. Apparatus for automatically controlling the magnitude of a direct current in a load at a predetermined value, the apparatus comprising a precision-resistance circuit and a power transistor and a first direct-current source and said load connected together in series whereby a voltage drop is generated across said precision-resistance circuit which is proportional to the magnitude of said direct current, a first photo-transistor electrically connected to said power transistor to vary the resistance of said power transistor as a function of the degree of illumination of said photo-transistor, a first reflecting galvonometer and a second direct-current source providing a highly stable reference voltage connected together in series across said precision-resistance circuit such that said reference voltage is in opposition to said voltage drop and whereby said first galvanometer responds to the voltage difference between said reference voltage and said voltage drop, the magnitude of the resistance of said precision-resistance circuit being so chosen that said voltage drop is equal in magnitude to said reference voltage when the magnitude of said direct current in said load is equal to said predetermined value, a third direct-current source, second and third photo-transistors arranged in close physical association, a direct-current bridge circuit supplied from said third source and having two of its arms respectively formed by said second and third photo-transistors, said first reflecting galvanometer responding to said voltage difference to vary the degree of illumination of said second and third photo-transistors whereby the output of said bridge circuit represents said voltage difference in magnitude and sign, and a second reflecting galvanometer electrically connected to said bridge circuit to respond to said output to vary said degree of illumination of said first photo-transistor.

21. Apparatus according to claim 20, wherein said precision-resistance circuit is formed by a single precision resistor.

References Cited

UNITED STATES PATENTS

| | | | |
|---|---|---|---|
| 3,116,396 | 12/1963 | Knudsen. | |
| 3,311,813 | 3/1967 | Sutcliffe | 323—21 X |
| 3,370,222 | 2/1968 | Haagen-Smit et al. | 323—4 |

JOHN F. COUCH, *Primary Examiner.*

A. D. PELLINEN, *Assistant Examiner.*

U.S. Cl. X.R.

250—230; 307—311; 323—21